May 4, 1926.
C. S. REAMY
RAKE
Filed Feb. 23, 1924
1,583,492
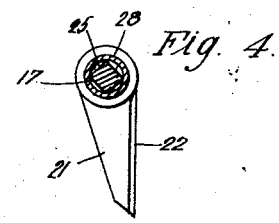
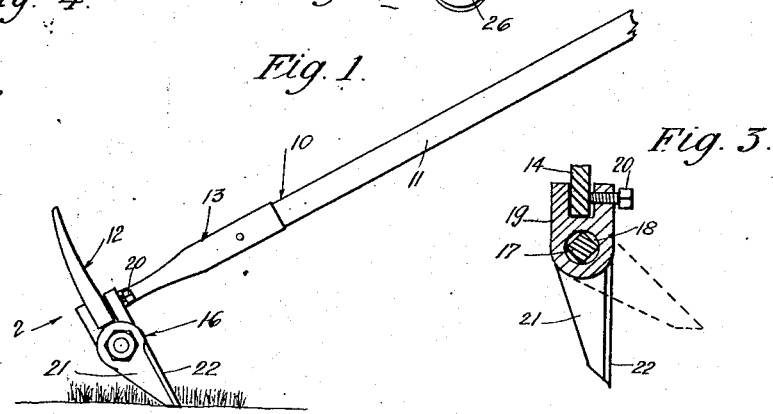
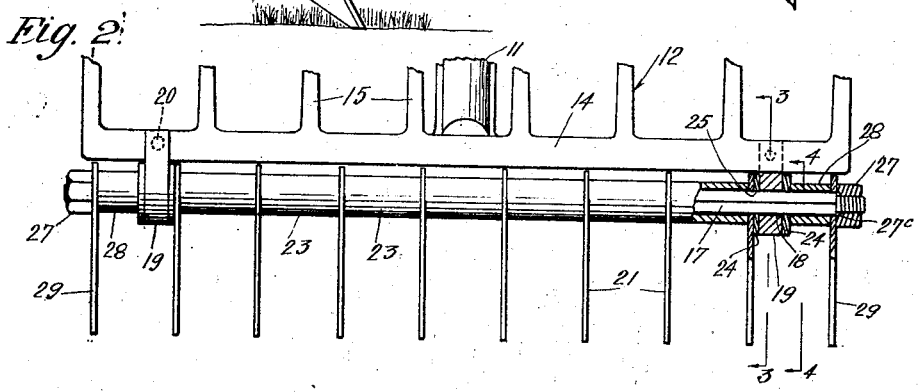
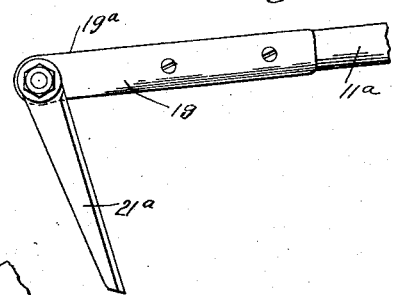
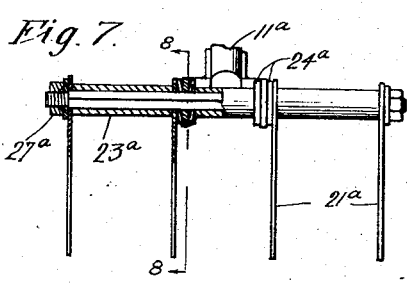
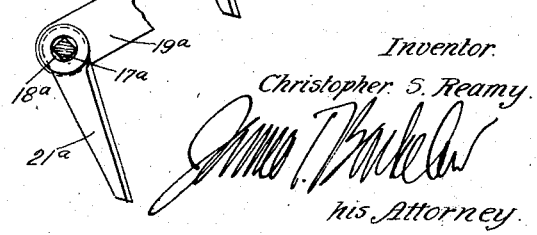
Inventor.
Christopher S. Reamy.
his Attorney.

Patented May 4, 1926.

1,583,492

UNITED STATES PATENT OFFICE.

CHRISTOPHER S. REAMY, OF LOS ANGELES, CALIFORNIA.

RAKE.

Application filed February 23, 1924. Serial No. 694,545.

*To all whom it may concern:*

Be it known that I, CHRISTOPHER S. REAMY, a citizen of the United States, residing in the city of Los Angeles, county of Los Angeles, and State of California, have invented new and useful Improvements in Rakes, of which the following is a specification.

This invention relates generally to rakes and like implements used for cultivating soil and raking gardens and lawns. While the rake of my invention may be used in many situations, as will be apparent to those into whose hands the implement comes, it is particularly effective for clearing lawns of noxious weeds such as "Bermuda grass". This grass is in the nature of a creeping, vine-like weed and is not only unsightly in itself but also chokes off the growth of lawn grass to such an extent that entire lawns are often ruined by its presence. It is extremely difficult to rid a lawn of this weed for it hugs the ground so closely that the ordinary lawn mower passes over it without cutting it down, while its clinging tendency and its vine-like growth renders it a most tedious and almost impossible task to remove the weed by resorting to hand pulling or the use of an ordinary lawn rake.

I have devised a rake with blade-like tines, so, as the rake is drawn over a weed infested lawn, the blades not only catch under and root out some of the weeds but also cut the weed strands into relatively short lengths, so such lengths may be readily removed by subsequent raking with a usual lawn rake. Such short lengths as still remain rooted, spring into vertical position, or are lifted by the rake blades into such position, whereupon they may be cut down by subsequent lawn mower operation.

I have also devised a rake construction whereby the degree of angularity between the rake handle and tines may be varied at the will of the operator, thus making it possible to hold the rake handle at the elevation most suited and desirable to the operator and yet have the blades inclined so they are best positioned with relation to the ground line and to most effectively operate on said weeds. This feature of adjustability may be applied, of course, with equal advantage to rakes of usual construction.

I have also provided my rake with removable blades or tines, whereby tines in varying number and of different configuration and characteristics may be supported by a single rake bar. Furthermore, I provide means for shifting and then fixing the blades laterally along the supporting bar in order to vary the relative coarseness of the rake.

The rake is of sturdy construction, is capable of being quickly and easily assembled, and offers many other advantages over the usual rake that will be immediately apparent to those accustomed to use this class of implement. A better understanding of the rake, its objects and features of novelty, will be had from the following detailed description, reference being had to the accompanying drawings wherein—

Figure 1 is a side elevation showing an embodiment of the invention wherein the structure including certain of the features of novelty is shown as removably attached to an ordinary lawn rake.

Fig. 2 is an enlarged fragmentary elevation of Figure 1 as viewed from the position indicated by arrow 2.

Fig. 3 is a vertical section on line 3—3 of Figure 2.

Fig. 4 is a vertical section on line 4—4 of Figure 2.

Fig. 5 is a perspective view of a clamping washer used in connection with the device.

Fig. 6 is a side elevation of a modified embodiment of the invention wherein the novel features are applied to a digging tool or implement.

Fig. 7 is a front elevation of Figure 6, parts being shown in section.

Fig. 8 is a section on line 8—8 of Figure 7.

In Figure 1, the numeral 10 indicates an ordinary rake consisting of a handle 11 and tine structure 12 joined by the socketed stock 13. The tine structure is made up of cross member 14 and tines 15, the latter extending at substantially right angles with the axis of handle 11. I employ cross member 14 as the supporting element for the removable blade structure generally indicated at 16.

A cross bar 17, preferably of polygonal cross section, extends through round apertures 18 in supporting brackets 19 which are adapted to be removably clamped to member 14 by set screws 20. The diameters of apertures 18 are such that square rods 17 may longitudinally slide freely therethrough and rotate therein.

Alternately arranged on rod 17 are the blades 21, preferably sharpened along their forward edges 22 and of any desired configuration, and spacers 23. On rod 17 and immediately adjacent brackets 19 are the clamping washers 24, the blades 21 and washers 24 being provided with square apertures 25 and 26, respectively, whereby said blades and washers are slidably but non-rotatably mounted on rod 17. Of course, other suitable means may be provided for keying the blades and washers to the rod, but the illustrated mounting is preferable by reason of its simplicity and cheapness of manufacture and the absence of projecting keys which might interfere with the movement of the rods through bracket apertures 18.

It is apparent that by taking up nuts 27, which are threaded on the ends of rod 17, washers 24 will frictionally engage brackets 19 and thereby hold the rod and its associated blades against rotation. The terminal spacers 28 and terminal blades 29 are thrust toward brackets 19 by thus taking up nuts 27, and such terminal blades are thereby held firmly against side play along the rod.

To vary the angularity between the blade and handle 11, it is only necessary to loosen nuts 27, rotate the bar 17 by grasping and swinging one of the blades, and then again taking up the nut to fix the bar and blades in adjusted position. The movement of all the blades during such adjustment is, of course, simultaneous.

By utilizing spacers of different lengths to vary the distance between adjacent blades, the relative coarseness of the rake may be varied to suit the needs and desires of the operator in performing a give task. By the arrangement above described, my improvement may be used as an attachment for ordinary lawn rakes, thus materially reducing the cost over that which would be incurred were two rakes of such dissimilar characteristics to be employed, it being apparent from consideration of Figure 1 that the rake may be turned top for bottom when it is desired to change from one type of rake to the other.

In Figures 6 to 8, inclusive, I have shown the invention applied to a digging or cultivating tool wherein the square cross bar $17^a$ is supported directly from the handle socket $13^a$ on the end of handle $11^a$; the implement embodying the invention in this form thus being in the nature of a complete structure in itself.

The ears $19^a$ of socket $13^a$ are provided with round apertures $18^a$ whereby rod $17^a$ is supported in a manner similar to that described in connection with rod 17 and brackets 19, respectively. Blades $21^a$, spacers $23^a$, washers $24^a$ and nuts $27^a$ are similar to and cooperate in the same manner as do blades 21, spacers 23, washers 24 and nuts 27, respectively.

It will be noted that nuts 27 are preferably undercut at $27^c$ so as to insure bearing engagement between said nuts and the outermost blades 21, even though the square portion of rod 17 extends a limited distance beyond the outer face of the outermost blade.

While I have shown and described certain embodiments of my invention, I do not wish to be limited thereto, except for such limitations as a fair interpretation of the appended claim may import.

I claim:

In a rake, a handle, spaced supporting brackets thereon with side friction surfaces, a bar extending through and rotatable in the brackets, a spacer around the bar between the brackets, washers keyed on the bar and bearing against said side friction surfaces, alternating spacers and tines on the bar, the tines being keyed to the bar, the ends of the bar being threaded, and nuts on the bar ends to compress between them the tines, brackets, spacers and washers, compressing the washers against the friction surfaces of the brackets to hold the washers and rod and tines frictionally against rotation.

In witness that I claim the foregoing I have hereunto subscribed my name this 11 day of February 1924.

CHRISTOPHER S. REAMY.